United States Patent
Eichholz et al.

(10) Patent No.: US 6,832,804 B2
(45) Date of Patent: Dec. 21, 2004

(54) CONVERTIBLE VEHICLE HAVING AT LEAST ONE RIGID ROOF END MEMBER

(75) Inventors: Stefan Eichholz, Bohmte (DE); Frank Neubrand, Edinborough, MI (US)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/249,600

(22) Filed: Apr. 23, 2003

(65) Prior Publication Data

US 2004/0036312 A1 Feb. 26, 2004

(30) Foreign Application Priority Data

Apr. 23, 2002 (DE) .......................................... 102 17 915

(51) Int. Cl.⁷ ................................................... B60J 7/14

(52) U.S. Cl. ............................. 296/107.08; 296/136.05; 296/108; 296/24.44

(58) Field of Search ........................... 296/107.08, 108, 296/136.05, 24.44

(56) References Cited

U.S. PATENT DOCUMENTS

| | | | | |
|---|---|---|---|---|
| 1,940,444 A | * | 12/1933 | Burgman | 296/107.08 |
| 6,092,335 A | | 7/2000 | Queveau et al. | 49/192 |
| 6,145,915 A | * | 11/2000 | Queveau et al. | 296/107.08 |
| 6,254,165 B1 | * | 7/2001 | Neubrand | 296/76 |
| 6,390,532 B1 | | 5/2002 | Mac Farland | 296/107.17 |
| 6,652,017 B2 | * | 11/2003 | Wagner et al. | 296/107.08 |

FOREIGN PATENT DOCUMENTS

| | | | |
|---|---|---|---|
| DE | 298 12 165 U1 | | 6/1999 |
| EP | 01136295 | * | 9/2001 |

* cited by examiner

Primary Examiner—Dennis H. Pedder
(74) Attorney, Agent, or Firm—Gudrun E. Huckett

(57) ABSTRACT

A convertible vehicle has a carbody having a rear area and a roof stowable in the rear area of the carbody. The roof has a rigid rear roof end member and a rear window. A passageway allows movement of the roof relative to the carbody. The passageway, when the roof is in a closed position, is located in front of the rear roof end member and below the rear window. A movable cover functioning as a rear deck closes the passageway at least partially. The movable cover is connected to the roof in an area of the rear roof end member and is movable together with the roof.

8 Claims, 7 Drawing Sheets

CONVERTIBLE VEHICLE HAVING AT LEAST ONE RIGID ROOF END MEMBER

BACKGROUND OF INVENTION

1. Field of the Invention

The invention relates to a convertible vehicle having a convertible roof or top that can be stowed in a rear vehicle area, wherein the roof or top comprises at least one rigid rear roof end member and wherein a passageway, allowing movement of the roof and is positioned in front of the rear roof end member and below the rear window when the roof is closed, can be covered at least partially by a movable cover configured like a rear deck.

2. Description of the Related Art

In convertible vehicles of this type, the cover is provided in order to avoid an open compartment behind the last row of seats and in order to provide a visually closed appearance in front of the rear roof end member underneath the rear window. The passageway is at the same time also protected against manual access. Also, it is prevented that articles could be lost by falling into the compartment.

When the roof is open (i.e., the top is down), the passageway inclusive of the area which is taken up by the rear roof end member when the roof is closed, should also be covered in order to provide a closed and, in particular, visually pleasing covering of the carbody in this area.

DE 298 12 165.4 U1 discloses a rear deck which, in the case of the roof being closed as well as the roof being open, covers the passageway for the roof and, during movement of the roof, can be moved into a vertical position secured in front of the rear roof end member within the carbody. Such a solution requires a high expenditure with regard to construction measures. Moreover, a significant amount of space within the carbody must be made available for receiving the extension when in the vertical position.

SUMMARY OF INVENTION

It is an object of the present invention to simplify a convertible vehicle with respect to the movement of the rear deck.

In accordance with the present invention, this is achieved in that the cover is arranged on the roof in the area of the rear roof end member and is movable together with the roof.

According to the invention, a separate space within the carbody of the vehicle, for example, during the opening movement of the roof, is not required. The drive and control expenditure for the cover can be coupled with the roof stowing mechanism. By connecting the cover to the roof, it is possible to save additional components. Moreover, linkage members in order to secure the cover on the carbody are no longer required.

When, with the roof in the open position, the cover has been moved into a pivoted position substantially parallel to the plane of extension of the rear window, an especially flat configuration for the cover results. It can be secured in an intermediate position within the package of several roof parts in a space saving way. Because the cover is very flat, the folded roof package, overall, is not enlarged.

An especially simplified drive and holding mechanism results when the cover in the area of the rear roof end member is connected pivotably to the rear roof part. In this way, the movement of the cover relative to the rear roof part can be limited to a simple pivoting movement without requiring several overlapping movements. The joints can be embodied as simple swivel joints.

DETAILED DESCRIPTION

Figure 1:
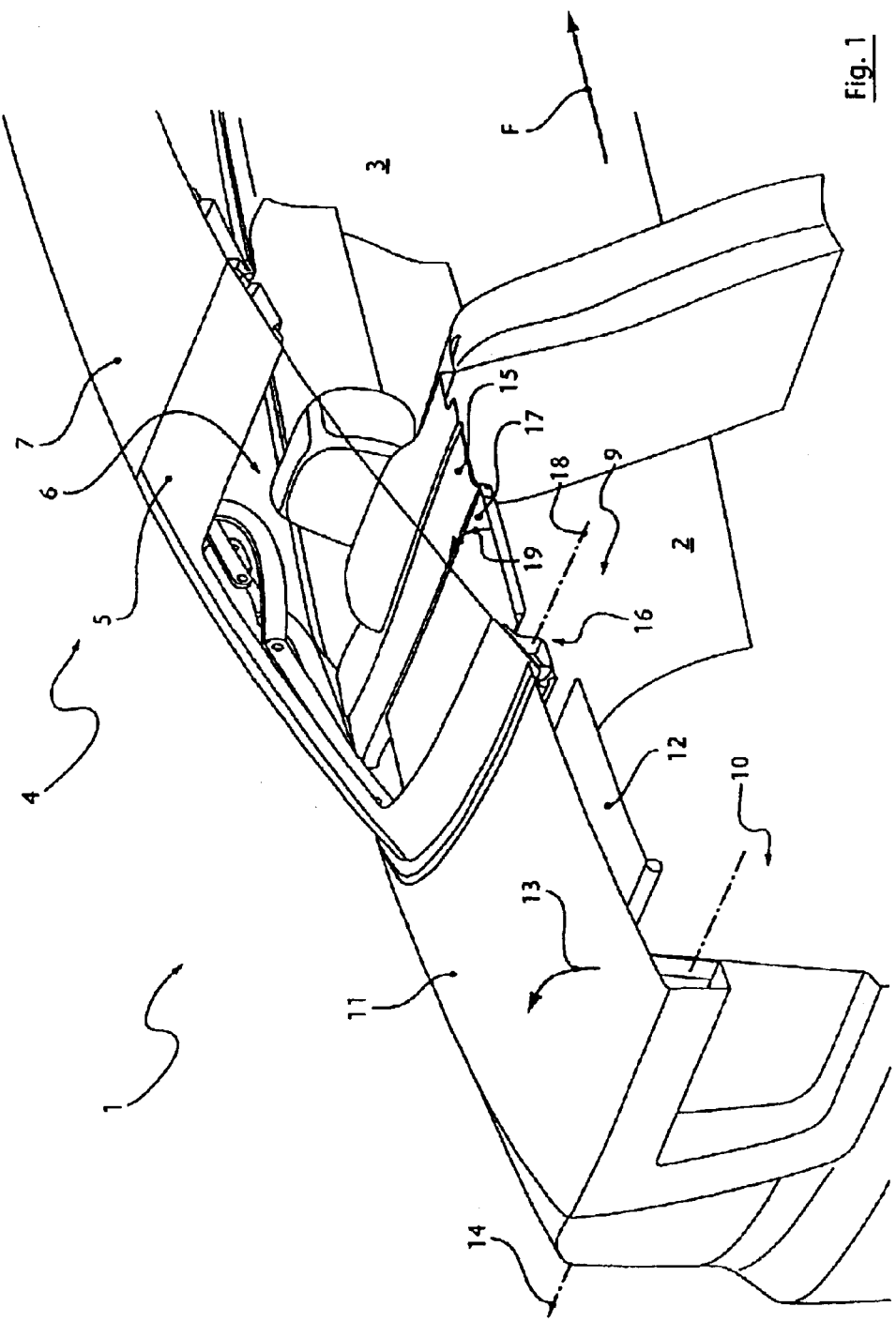
FIG. 1 is a schematic view of a convertible vehicle according to the invention in a configuration with three rigid roof parts viewed at an angle from the rear with the roof in the closed position.

The convertible vehicle 1, illustrated in an exemplary fashion, comprises a carbody 2 having a passenger compartment (interior) 3 for front and rear passengers. This interior 3 can be covered by a convertible roof (top) 4. The roof 4 is of a three-part configuration and comprises an essentially rigid rear roof part 5 with a rear window 6 embedded therein as well as a central roof part 7, which is positioned farther to the front relative to the rear roof part 5, and a front roof part 8 which, when the roof 4 is closed, is in contact with the frame of the windshield. The three-part roof configuration is not mandatory. In particular, in the case of an interior which has only a single row of seats, a two-part roof configuration may be sufficient. Also, it is not required that the entire roof 4 be comprised of rigid roof parts 5, 7, 8. A partially flexible configuration of the roof 4 is possible. In any case, a rigid, rear roof end member 16 forming the bottom edge of the rear roof part is present which, for example, can be formed of a bow tube in the case of a flexible roof (soft top).

In the illustrated embodiment, all of the roof parts 5, 7, 8 are of a rigid construction, for example, of plastic material, metal, including foamed metal material, or any other suitable material.

Figure 2:
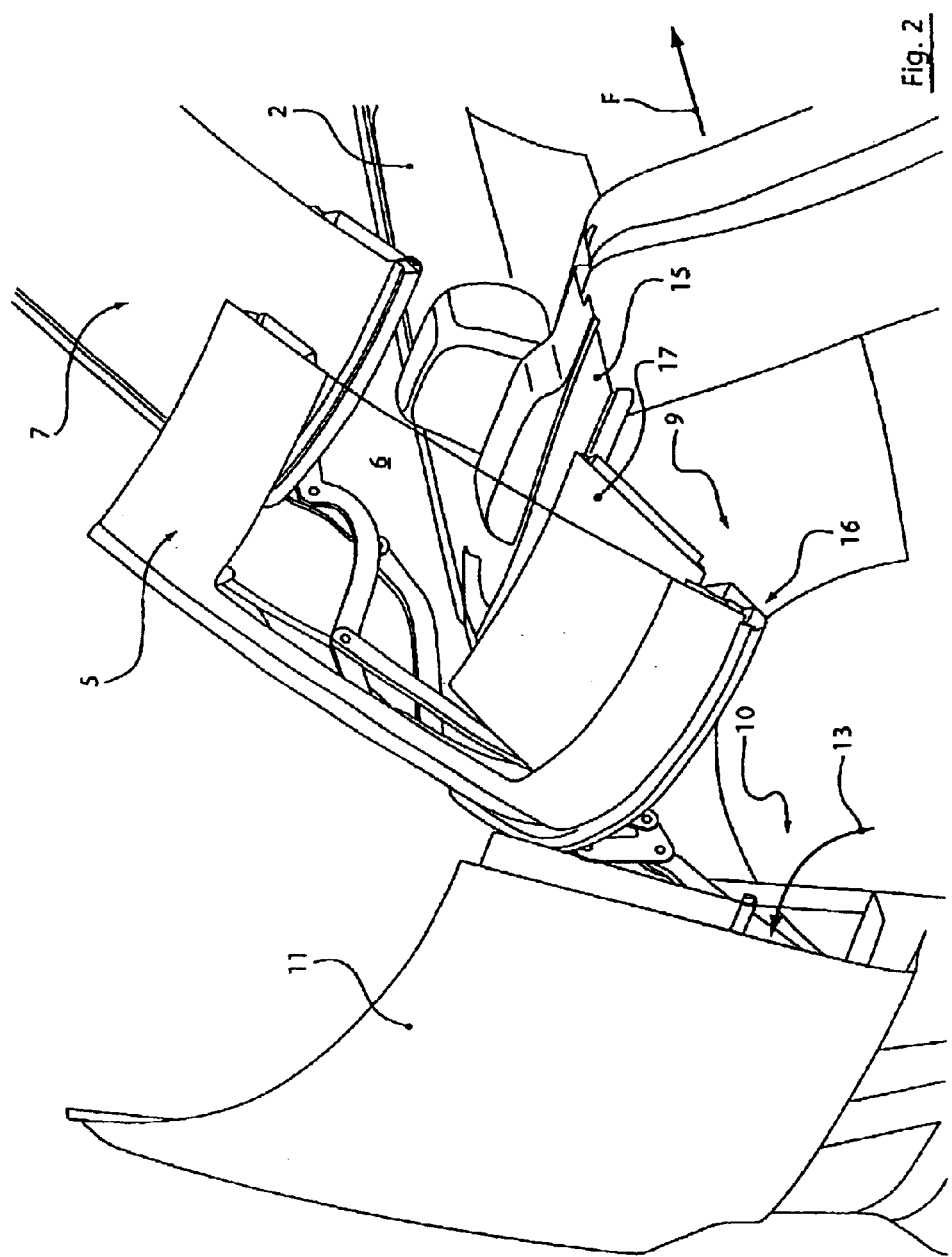
FIG. 2 is a view similar to the view of FIG. 1 during the first phase of opening the roof.
Figure 7:
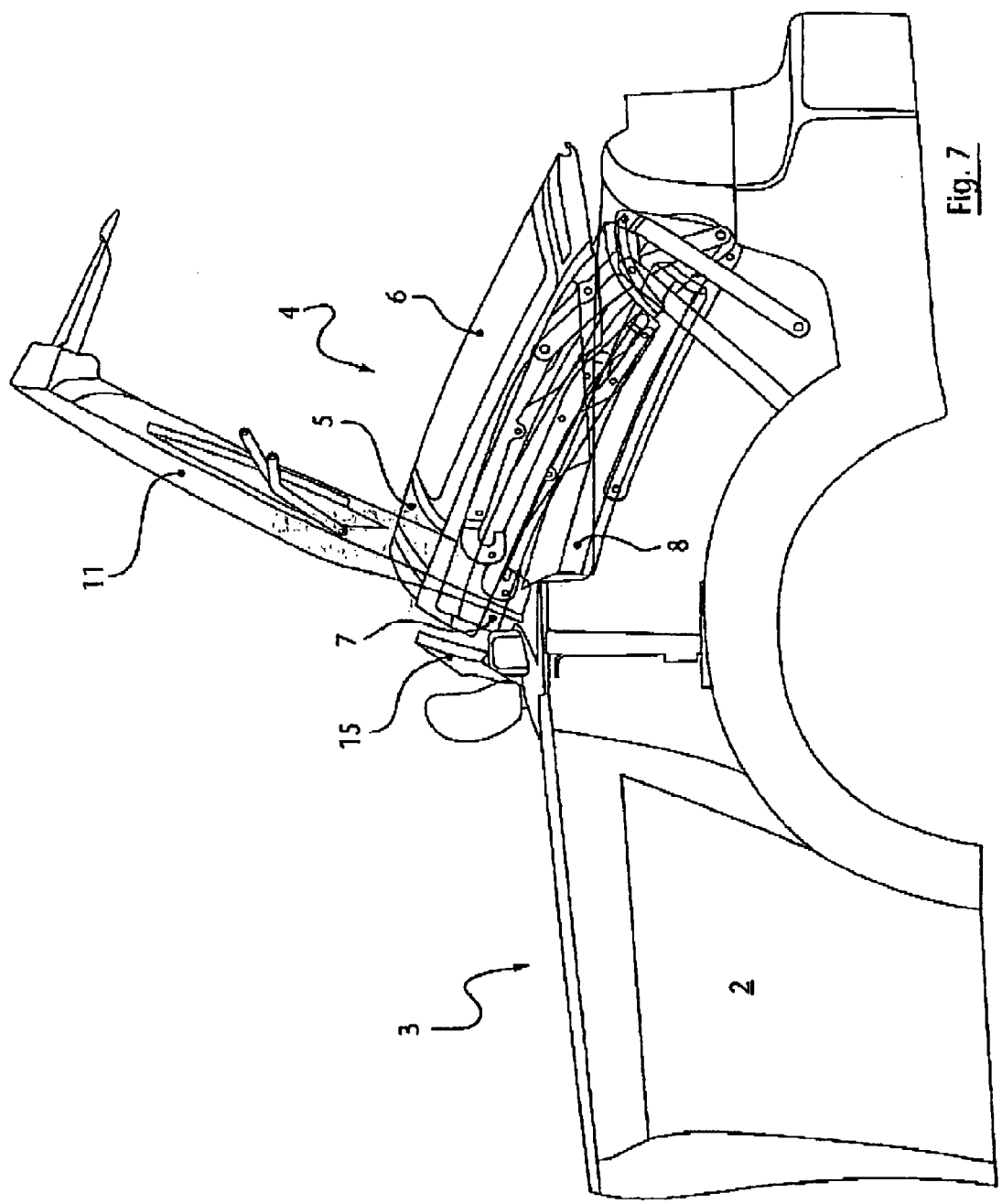
FIG. 7 is a side view of the lid pivoted for access to the trunk.

The roof 4 can be stowed in the rear area of the carbody 2 in a roof receiving compartment 9 which, when the roof 4 is closed, can be used as part of the trunk 10. The roof receiving compartment 9 and the trunk 10 together are covered at the top side by a lid 11. In a first opening direction, the lid 11 can be pivoted into a first open position (FIG. 2) for releasing the passageway for the roof 4 and, in a second opening direction, can be pivoted into a second open position for stowing or removing luggage (FIG. 7).

The lid 11 comprises a telescoping extension 12 which, when the roof 4 is closed (FIG. 1), is secured underneath the roof cover 11 and, when the roof 4 is open (FIG. 6), is in an aligned position relative to the lid 11 in front of the lid 11.

Figure 6:
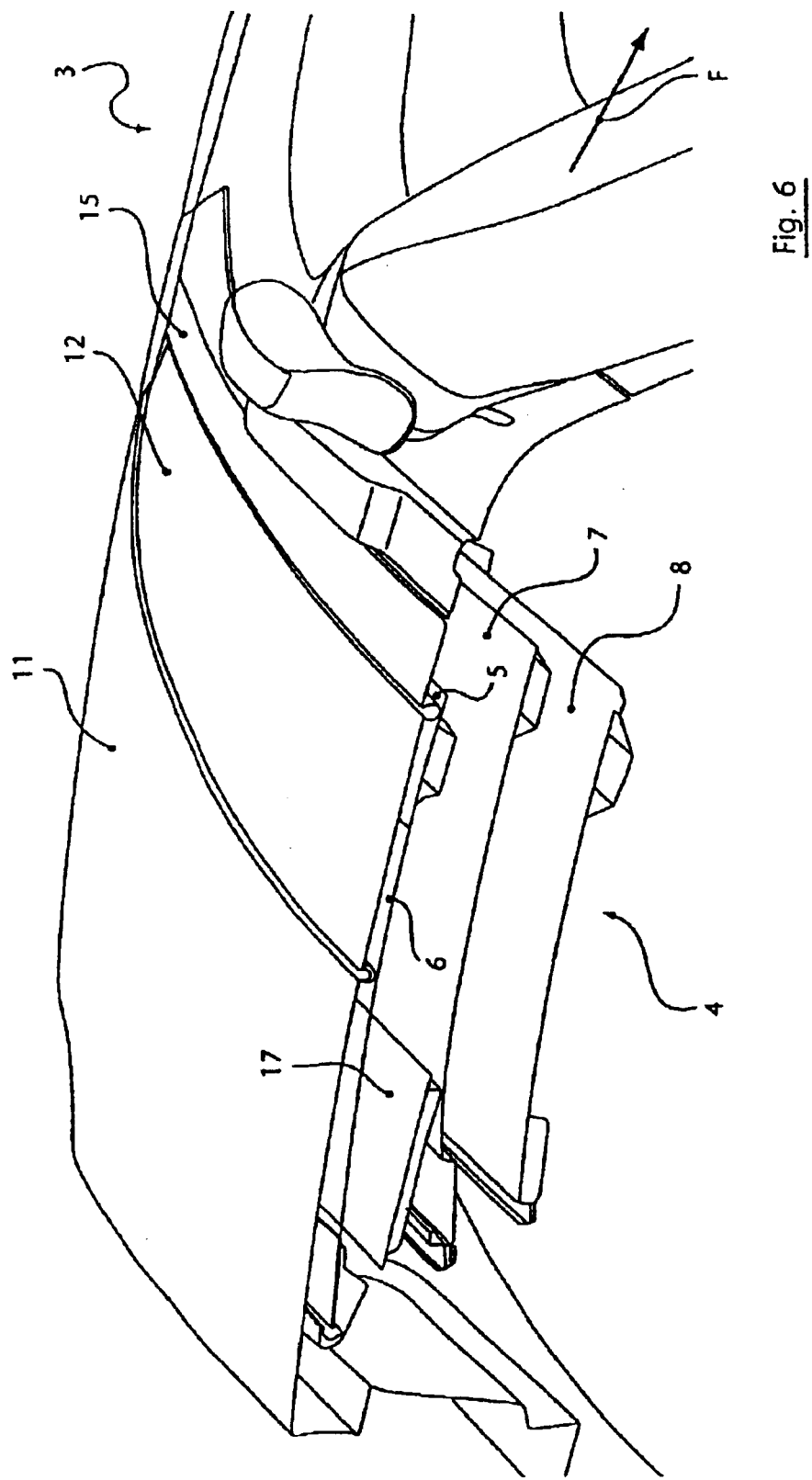
FIG. 6 is a view from above, partially in section, onto the rear area of the convertible vehicle with the roof being completely stowed and the cover being closed above it.

For this purpose, the extension 12 is secured by means of a four-bar linkage 20, 21, 22, 23 on the lid 11. The corresponding guide bars 24, 25 have a sufficient length in order to effect, during pivoting, a significant longitudinal movement of the extension 12 relative to the lid 11 so that the two extreme positions shown in FIG. 1 and FIG. 6 are made possible.

When the roof 4 is closed, a cover 17 is provided underneath the rear window 6 and in front of the rear roof end member 16. The cover 17 is pivotably connected to the rear roof part 5 in the area of the rear roof end member 16. This cover 17 is configured like a rear deck and can be covered, for example, with a textile material or leather in order to provide in this way a visual and haptic adaptation to the interior appearance of the passenger compartment 3.

The cover 17 can be pivoted relative to the rear roof end member 16 about an axis 18 which extends transversely to the travel direction F of the vehicle.

For opening the roof 4, first the lid 11 is pivoted from the substantially horizontal position illustrated in FIG. 1, in which it is matched flush with the exterior skin of the carbody 2, into an open position about the rear transverse axis 14 in the direction of arrow 13. In the illustrated embodiment, the lid 11 is divided at the axis 14 so that the vertical area 11a of the lid 11 during the aforementioned pivot movement into the open position remains stationary and only the horizontal part of the lid 11 is pivoted into an open position. However, this division is not mandatory. A one-part configuration of the lid 11 is also possible.

Figure 3:
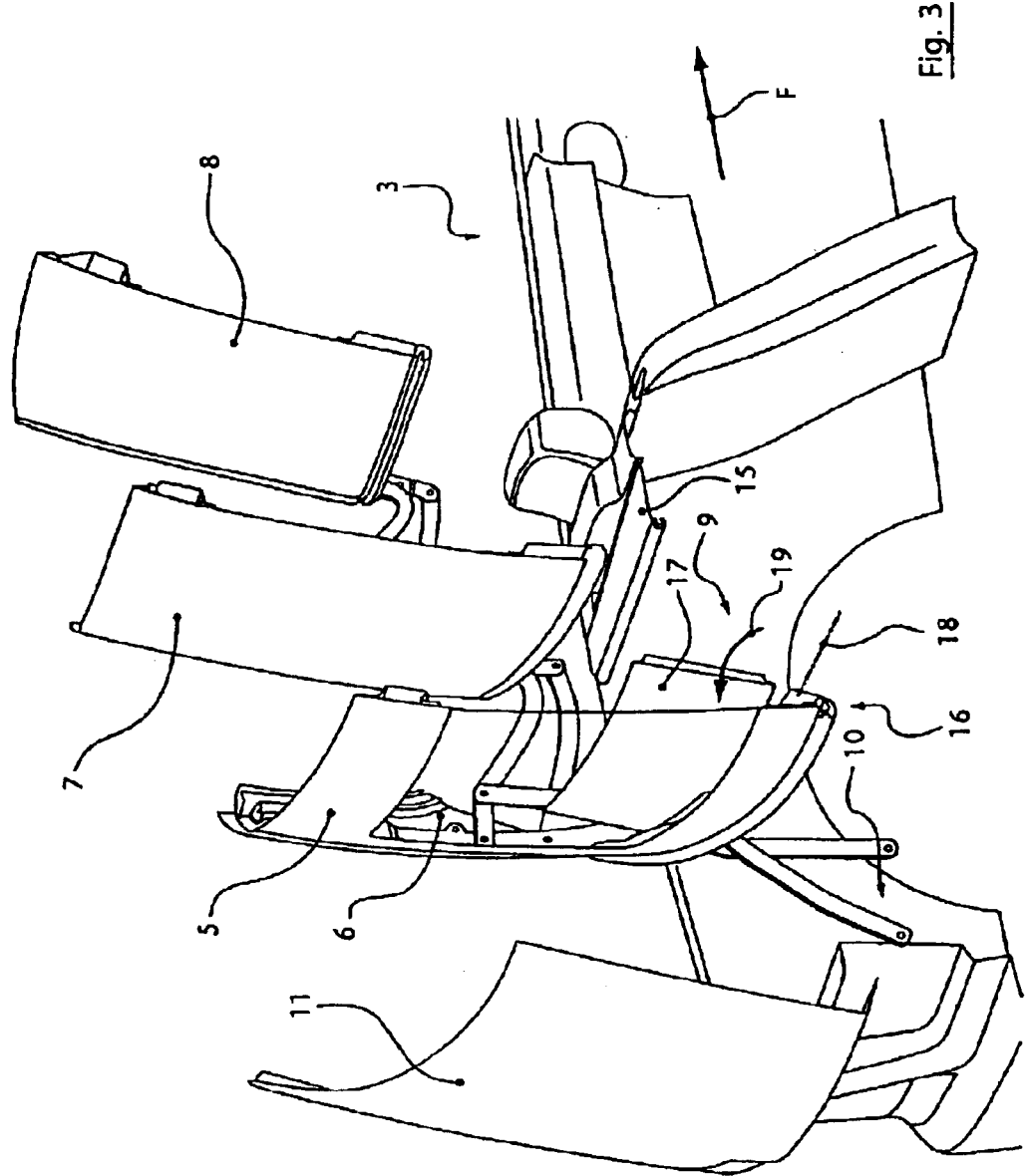
FIG. 3 is a view similar to FIG. 2 with the roof opening movement having progressed.
Figure 4:
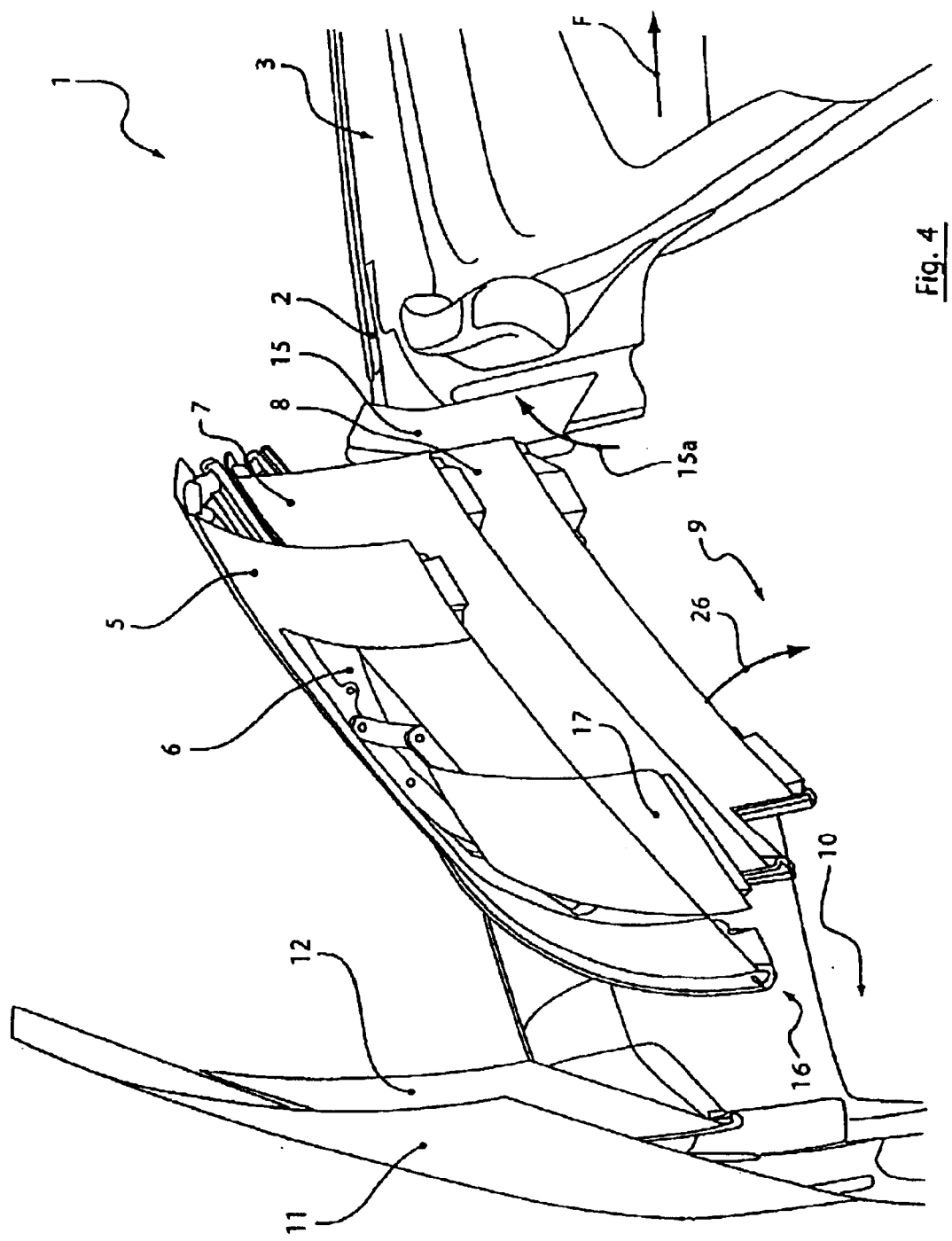
FIG. 4 is a view similar to the view of FIG. 3 after formation of a package of several roof parts and downward movement of the package into the carbody.

In a first movement phase of opening the roof 4 (FIGS. 2, 3), the rear roof part 5 is pivoted about a main bearing in the upper carbody area. By pivoting the rear roof part 5 into the open position, pivoting of the forward roof parts 7, 8 takes place at the same time. The roof parts 7, 8 themselves are not connected to the carbody but are connected to one another and to the rear roof part 5. All three illustrated roof parts 5, 7, 8 are pivoted relative to one another into a parallel position and are thus nested within one another: the forwardly positioned roof part 7, 8 with its outer curved portion is received in the inner curved portion of the rearwardly located roof part 5, 7, respectively.

During this first movement phase (transition from FIG. 1 to FIG. 3), the cover 17 is pivoted in the direction of arrow 19 relative to the rear roof part 5 about the axis 18 so that an approximately parallel position (FIG. 3) between the plane of the rear window 6 and the plane of extension of the cover 17 results. The cover 17 can then be secured at a tight spacing underneath the rear window 6.

At the end of the first movement phase, the cover 17 is secured between the rear roof part 5 and the central roof part 7 which is positioned in front of part 5 when the roof 4 is closed. In this position, the space requirement of the cover 17 is minimized. The spacing between the nested roof parts 5, 7 with the cover 17 arranged therebetween can be similar to, or as small as, the arrangement without the cover 17; the cover 17 can be rigid or at least partially flexible.

Figure 5:
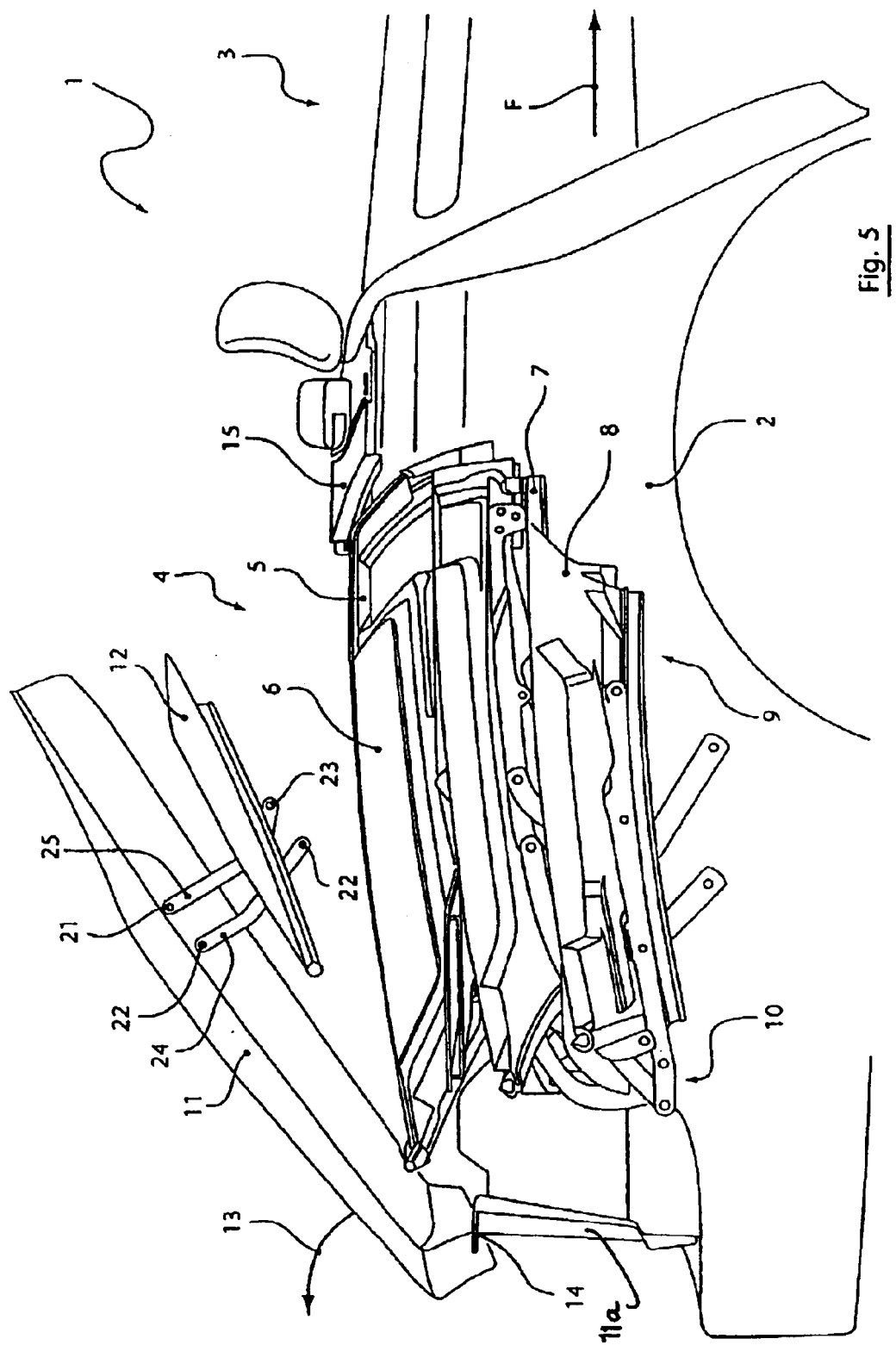
FIG. 5a side view of the package of roof parts completely stowed within the carbody.

The nested roof parts can be stowed in a second movement phase in the direction of arrow 26 in the carbody 2 so that the end position illustrated in FIG. 5 results.

In addition to the cover 17 arranged at the rear roof part 5, a forward cover 15 can be provided which can be pivoted in the direction of arrow 15a in the second movement phase of the roof opening action.

While stowing the roof, the lid 11 can be moved downwardly counter to the direction of arrow 13 in a closing movement wherein at the same time the four-bar linkage 20, 21, 22, 23 opens and the guide bars 24, 25 are moved into a substantially parallel position relative to the plane of extension of the lid 11 so that the extension 12 is moved into an aligned position in front of the lid 11. Overall, in the closed position of the lid 11 (FIG. 6), the roof 4 is covered by the forward cover 15, the extension 12 adjoining counter to the travel direction F, and the rearwardly adjoining lid 11.

In this way, an aligned position of the aforementioned parts is achieved which provides a visually uniform appearance. In the stowed position of the roof 4, the cover 17 remains between the roof parts 5, 7 and is positioned substantially parallel to them.

While specific embodiments of the invention have been shown and described in detail to illustrate the inventive principles, it will be understood that the invention may be embodied otherwise without departing from such principles.

What is claimed is:

1. A convertible vehicle (1) comprising:
   a carbody (2) having a rear area;
   a roof (4) connected to the carbody (2) stowable in the rear area of the carbody (2), wherein the roof (4) comprises a rigid rear roof end member (16) and a rear window (6);
   a passageway allowing movement of the roof (4) relative to the carbody (2), wherein the passageway, when the roof (4) is in a closed position, is located in front of the rear roof end member (16) and below the rear window (8);
   a movable cover (17) as a rear deck for closing the passageway at least partially;
   wherein the movable cover (17) is connected to the roof (4) in an area of the rear roof end member (16) and is movable together with the roof (4);
   wherein the roof (4) comprises a rear roof part (5) and wherein the rear roof end member (16) is a part of the rear roof part (5) and forms a bottom edge of the rear roof part (5), wherein the moveable cover (17) is pivotably connected to the rear roof end member (16).

2. The convertible vehicle according to claim 1, wherein the movable cover (17), when the roof (4) is in the closed position, is secured in a substantially horizontal position at an angle to a plane of extension of the rear window (6).

3. The convertible vehicle according to claim 2, wherein the movable cover (17), when the roof (4) is in an open position, is in a pivoted position parallel relative to the plane of extension of the rear window (6).

4. The convertible vehicle according to claim 3, wherein the roof (4) comprises at least one rigid rear roof part (5) and wherein the rear window (6) is a part of the rear roof part (5), wherein the roof (4) further comprises at least one forward roof part (7, 8) arranged in front of the rigid rear roof part (5) in a travel direction of the convertible vehicle when the roof (4) is in the closed position, wherein, in a first movement phase of opening the roof (4), the movable cover (17) is moved into a parallel position relative to the rear window (6) and the at least one forward roof part (7, 8) is nested in a curved portion of the rear roof part (5), wherein the cover (17) is positioned between the rear roof part (5) and an immediately adjacent one (7) of the at least one forward roof part (7, 8) in the travel direction of the convertible vehicle.

5. The convertible vehicle according to claim 4, wherein the rear roof part (5) and the at least one forward roof part (7, 8) at the end of the first movement phase are positioned substantially vertically and form a package, wherein the package of the rear roof part (5) and of the at least one forward roof part (7, 8) is moved into a lowered horizontal position within the carbody (2).

6. The convertible vehicle according to the 5, wherein the carbody (2) has a lid (11) movable in a first opening direction for releasing the passageway for the roof (4) and movable in a second opening direction for releasing access to a trunk of the convertible vehicle.

7. The convertible vehicle according to claim 6, wherein the lid (11) has a telescoping extension (11) and wherein the telescoping extension (12) is located in a travel direction of the convertible vehicle in front of the lid (11) in an aligned position with the lid (11) above the roof (4) when the roof (4) is in an open position and stowed underneath the lid (11).

8. The convertible vehicle according to claim 7, wherein the telescoping extension (12), when the roof (4) is in the open position, covers the passageway for the roof (4), wherein the passageway, when the roof (4) is in the closed position, is partially covered by the movable cover (17).

* * * * *